(12) United States Patent
Park et al.

(10) Patent No.: US 11,320,714 B2
(45) Date of Patent: May 3, 2022

(54) ELECTRONIC PAPER, IMAGE FORMATION APPARATUS, AND PRINTING CONTROL METHOD

(71) Applicant: HP PRINTING KOREA CO., LTD., Suwon-si (KR)

(72) Inventors: Heung-sup Park, Suwon-si (KR); Eog-kyu Kim, Suwon-si (KR); Yun-tae Kim, Suwon-si (KR); Young-su Lee, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 246 days.

(21) Appl. No.: 16/335,594

(22) PCT Filed: Dec. 29, 2016

(86) PCT No.: PCT/KR2016/015450
§ 371 (c)(1),
(2) Date: Mar. 21, 2019

(87) PCT Pub. No.: WO2018/056525
PCT Pub. Date: Mar. 29, 2018

(65) Prior Publication Data
US 2020/0026142 A1  Jan. 23, 2020

(30) Foreign Application Priority Data

Sep. 22, 2016 (KR) .................. 10-2016-0121379

(51) Int. Cl.
*G02F 1/167* (2019.01)
*G03G 15/00* (2006.01)
*G03G 15/01* (2006.01)

(52) U.S. Cl.
CPC ......... *G02F 1/167* (2013.01); *G03G 15/0194* (2013.01); *G03G 15/5008* (2013.01)

(58) Field of Classification Search
CPC . G02F 1/167; G02F 1/09; G02F 1/094; G02F 1/13439; G02F 1/136213;
(Continued)

(56) References Cited

U.S. PATENT DOCUMENTS

| 6,407,763 | B1 | 6/2002 | Yamaguchi |
| 7,280,266 | B1 | 10/2007 | Chopra |

(Continued)

FOREIGN PATENT DOCUMENTS

| CN | 1720486 | 1/2006 |
| CN | 1854919 | 11/2006 |

(Continued)

*Primary Examiner* — Brandi N Thomas
(74) *Attorney, Agent, or Firm* — Staas & Halsey LLP

(57) ABSTRACT

The present application discloses an image formation apparatus that can transfer an image into electronic paper using an electronic photography method, and a printing control method for the image formation apparatus. The present electronic paper comprises an electrophoresis layer for displaying an image using an electrophoresis method, a conductive layer, and a film layer for transmitting an image; and the image formation apparatus comprises a communication interface for receiving printing data, an image formation unit for transferring an image corresponding to the printing data, and a processor for controlling the image formation unit.

14 Claims, 12 Drawing Sheets

(58) Field of Classification Search
CPC ......... G02F 2202/28; G02F 2001/1678; G02F 1/133348; G02F 1/133354; G02F 1/1334; G02F 1/133514; G02F 1/133516; G02F 1/16757; G02F 1/1677; G02F 1/1679; G02F 2201/52; G02F 2201/12; G02F 1/136227; G02F 1/136286; G02F 1/13363; G02F 1/1345; G02F 1/136209; G02F 1/136204; G02F 1/1368; G02F 2201/121; G02F 2203/01; G02F 1/03; G02F 1/133377; G02F 1/133512; G02F 1/133526; G02F 1/133553; G02F 1/133555; G02F 1/133633; G02F 1/134309; G02F 1/13606; G02F 1/136218; G02F 1/136277; G02F 1/136295; G02F 1/13685; G02F 1/21; G02F 2201/123; G02F 2202/104; G02F 2203/02; G02F 2203/04; G02F 2203/12; G02F 1/135; G02F 1/13; G02F 1/51; G02F 1/1362; G02F 2001/133633; G02F 2001/133638; G02F 2202/046; G06F 2203/04107; G06F 2203/04111; G06F 3/0418; G06F 3/0445; G06F 3/0446
See application file for complete search history.

(56) References Cited

U.S. PATENT DOCUMENTS

2005/0179643 A1\*  8/2005  Matsuura .............. G02F 1/1671
                                                 345/107
2009/0231266 A1\*  9/2009  Lee ....................... G09G 3/344
                                                 345/107

FOREIGN PATENT DOCUMENTS

| CN | 101013243 | 8/2007 |
|---|---|---|
| JP | 2010152385 | 7/2010 |
| JP | 2011237505 | 11/2011 |
| KR | 1020050085245 | 8/2005 |
| KR | 1020060122794 | 11/2006 |
| KR | 1020070079578 | 8/2007 |

\* cited by examiner

ELECTRONIC PAPER, IMAGE FORMATION APPARATUS, AND PRINTING CONTROL METHOD

TECHNICAL FIELD

The present disclosure relates to an electronic paper, an image formation apparatus, and a printing control method, and more particularly, to an electronic paper, an image formation apparatus, and a printing control method that may transfer an image into the electronic paper using an electronic photography method.

BACKGROUND ART

In general, an image formation apparatus refers to an apparatus that prints print data generated by a terminal device, such as a computer, on a recording paper. Examples of such an image formation apparatus may include a copy machine, a printer, a facsimile, or a multi-function peripheral (MFP) that complexly implements the functions of the copy machine, the printer, and the facsimile through a single device.

Recently, with the development of ultra-thin display technology, mobile products such as tablets are making various attempts to replace the paper beyond improving portability. In particular, because the paper industry is large and a value-added ratio generated by replacing the paper is very high, enterprise solution technologies replacing paper documents are emerging one after another.

One of such ultra-thin display technologies is an electrophoretic display. The electrophoretic display is a display that displays images or characters by changing an arrangement of white particles and black particles in a transparent solution according to an applied voltage difference.

Because a display state of such an electrophoretic display is determined according to the applied voltage difference, the conventional electrophoretic display had to include electrodes and transistors for applying a voltage to each capsule containing the white particles and black particles. However, such electrodes and transistors are obstacles to making the electrophoretic display thin and flexible.

DISCLOSURE

Technical Problem

Therefore, the present disclosure provides an electronic paper, an image formation apparatus, and a printing control method that may transfer images into the electronic paper using an electronic photography method.

Technical Solution

According to the present disclosure, an electronic paper includes: an electrophoretic layer to display an image in an electrophoretic manner; a conductive layer to be disposed on the top of the electrophoretic layer; and a film layer to be disposed on the bottom of the electrophoretic layer to transmit the displayed image.

The electrophoretic layer may include a plurality of cell structures in which charged particles are moved according to an applied potential difference.

The cell structure may be the form of a microcapsule or the form of a cup.

In each of the cell structures, the charged particles may be moved according to a potential difference between an upper conductive layer and a lower film layer of each of the cell structures.

The film layer may be formed of a thermoplastic resin.

The film layer may be formed of at least one material of an acrylic compound, an amide compound, a phthalate compound, polypropylene, and polyethylene.

The electronic paper may further include a protective layer to be disposed on at least one surface of the top and bottom of the electrophoretic layer.

The protective layer may include at least one of a cellulose pulp and an inorganic filler.

The electrophoretic layer and the film layer may be bonded to each other by a conductive adhesive material.

The film layer may have transparency of 60% or more.

According to the present disclosure, an image formation apparatus includes: a communication interface to receive print data; an image former to transfer an image corresponding to the received print data to an electronic paper; and a processor to perform an initialization by providing a common potential difference to each of a plurality of cell structures in the electronic paper, and to control the image former so that a potential value corresponding to the image is applied to each of the initialized plurality of cell structures.

The image former may include: a roller member to provide the common potential difference to each of the plurality of cell structures in the electronic paper; and a photoreceptor to provide a potential difference corresponding to the image to the electronic paper passing through the roller member.

The roller member may include: a first roller member to be rotated while being in contact with an upper portion side of the electronic paper; and a second roller member to be rotated while being in contact with a lower portion side of the electronic paper, and the first roller member and the second roller member provide different potentials to the electronic paper.

A width of the first roller member and a width of the second roller member which are perpendicular to a movement direction of the electronic paper may be different from each other.

The receptor and the first and second roller members may be disposed to be spaced apart from each other so that a distance between the photoreceptor and the first and second roller members is a length or more of the electronic paper.

The image former may further include: a charging member to charge the photoreceptor; an exposure member to expose light corresponding to the image to the charged photoreceptor; and a transfer member to transfer a surface potential of the photoreceptor to the electronic paper.

The common potential difference may have a value of 1V to 1000V.

According to the present disclosure, a printing control method of an image formation apparatus includes: initializing a plurality of cell structures by providing a common potential difference to each of the plurality of cell structures in an electronic paper; and applying a potential value corresponding to an image to each of the initialized plurality of cell structures.

The potential difference may have a value of 1V to 1000V.

DETAILED DESCRIPTION

Figure 1:
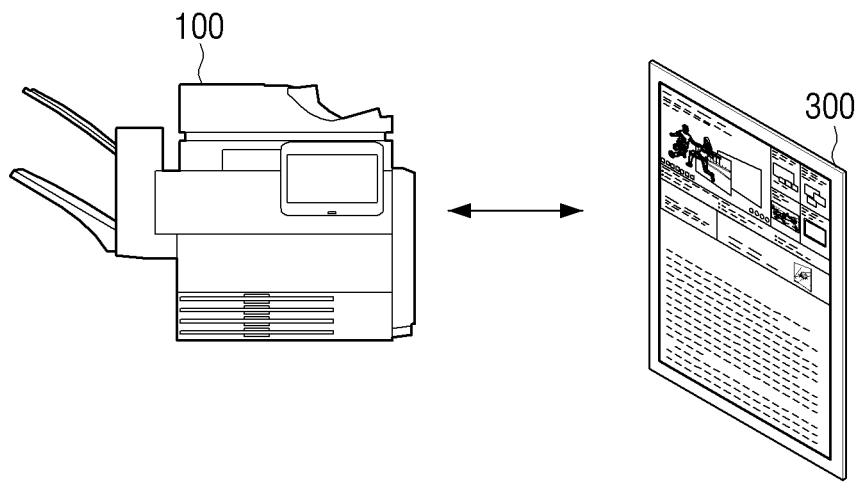
FIG. 1 is a view illustrating an image formation system according to an example of the present disclosure.

Because the present disclosure may be variously modified and have several examples, specific examples of the present disclosure will be illustrated in the drawings and be described in detail in the detailed description. However, it is to be understood that the present disclosure is not limited to specific examples, but includes all modifications, equivalents, and substitutions without departing from the scope and spirit of the present disclosure. When it is decided that a detailed description for the known art related to the present disclosure may obscure the gist of the present disclosure, the detailed description will be omitted.

Terms 'first', 'second', and the like, may be used to describe various components, but the components are not to be construed as being limited by these terms. The terms are used only to distinguish one component from another component.

Terms used in the present application are used only to describe specific examples rather than limiting the scope of the present disclosure. Singular forms are intended to include plural forms unless the context clearly indicates otherwise. It should be further understood that terms "include" or "constituted" used in the present application specify the presence of features, numerals, steps, operations, components, parts mentioned in the present specification, or combinations thereof, but do not preclude the presence or addition of one or more other features, numerals, steps, operations, components, parts, or combinations thereof.

In examples, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by specific hardware.

Meanwhile, as used herein, when any one component is referred to as being "connected to" another component, it means that any one component and another component are 'directly connected to' each other or are 'connected to' each other while having the other component interposed therebetween. Unless explicitly described to the contrary, "including" any component will be understood to imply the inclusion of other components rather than the exclusion of other components.

Meanwhile, as used herein, the term "image forming job" may refer to various jobs (e.g., print, scan, or fax) related to an image, such as forming an image or creating/storing/transmitting of an image file, and the term "job" may refer not only to the image forming job, but also to a series of processes necessary for performing the image forming job.

In addition, an "image formation apparatus" may refer to all apparatuses capable of performing the image forming job, such as the printer, the scanner, a fax machine, the multi-function printer (MFP), or a display device.

In addition, the term "hard copy" may refer to an operation of outputting an image onto a print medium such as paper, and the term "soft copy" may refer to an operation of outputting an image onto a display device such as a TV or a monitor.

In addition, the term "contents" may refer to all kinds of data that are subject to the image forming job, such as photographs, images, or document files.

In addition, the term "print data" may refer to data converted into a printable format in the printer.

In addition, the term "scan file" may refer to a file generated by scanning an image in the scanner.

In addition, the term "user" may refer to a person who performs an operation related to the image forming job by using the image formation apparatus or by using a device connected with the image formation apparatus in a wired or wireless manner. In addition, the term "administrator" may refer to a person who has authority to access all the functions and systems of the image formation apparatus. "Administrator" and "user" may be the same person.

Hereinafter, various examples will be described with reference to the accompanying drawings. The examples described below may be modified and implemented in various different forms. In order to more clearly describe the features of the examples, a detailed description of known matters to those skilled in the art will be omitted.

FIG. 1 is a view illustrating an image formation system according to an example of the present disclosure.

Referring to FIG. 1, an image formation system may be constituted by an image formation apparatus 100 and an electronic paper 300.

The image formation apparatus 100 may receive print data from an external apparatus, and print the received print data in an electrophotographic manner. Specifically, the image formation apparatus 100 may transfer an image corresponding to the print data received from the external apparatus to the electronic paper 300 in the electrophotographic manner. Here, the electrophotographic manner (or laser printer manner) means a manner of charging a surface of the photoreceptor, forming a latent image through exposure, and then forming an image through the formed latent image. In a general electrophotographic manner, a print job is performed by coating toner in the formed latent image and transferring the toner to a print paper. Meanwhile, in the electrophotographic manner applied to the electronic paper according to the present example, the print job is performed by moving charged materials in cell structures in the electronic paper using the formed latent image. Such a manner will be described in detail with reference to FIG. 4.

In addition, the image formation apparatus 100 may scan a manuscript and print a scanned image of the manuscript on the electronic paper 300. The detailed configuration and operation of the image formation apparatus 100 will be described below with reference to FIGS. 2 and 3.

The electronic paper 300 may be loaded on the image formation apparatus 100, and may be transferred with the image according to the latent image formed on the photoreceptor of the image formation apparatus to display the image. Specifically, the electronic paper 300 includes an electrophoretic layer constituted in a plurality of cell structures capable of selectively displaying specific color (e.g., black) according to an applied potential difference, and each microcapsule selectively displays the specific color according to the latent image formed on the photoreceptor. Here, the cell structure may have a capsule shape and may also have a cup shape. The detailed configuration and operation of the electronic paper will be described below with reference to FIG. 8.

Because the image formation system according to the present example as described above may transfer the image to the electronic paper in the general electrophotographic manner, the electronic paper 300 may omit electrodes, transistors, and the like necessary for image transfer. Accordingly, it is possible not only to achieve thinness and lightness of the electronic paper 300 but also to produce the electronic paper 300 at a low price.

Meanwhile, in the description of FIG. 1, it is described that the image formation apparatus 100 performs only the function of transferring the image to the electronic paper, but, at the time of implementation, the image formation apparatus 100 may be a dedicated apparatus that performs not only the function of transferring the image to the electronic paper but also the function of printing the image on a printing paper.

Figure 2:
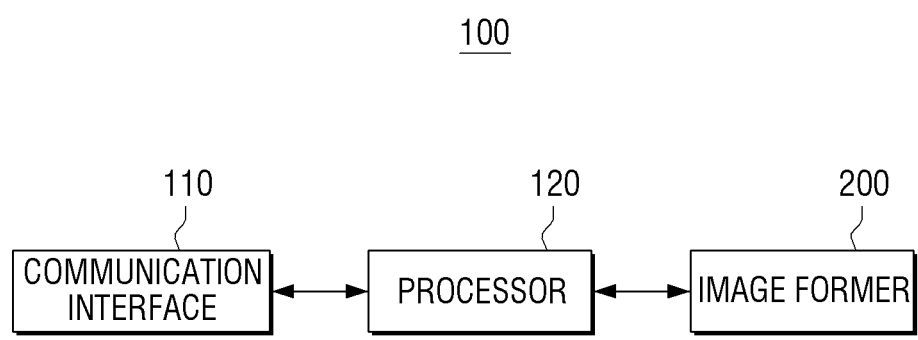
FIG. 2 is a block diagram illustrating a simplified configuration of an image formation apparatus of FIG. 1.

FIG. 2 is a block diagram illustrating a simplified configuration of the image formation apparatus of FIG. 1.

Referring to FIG. 2, the image formation apparatus 100 according to an example of the present disclosure includes a communication interface 110, a processor 120, and an image former 200. The image formation apparatus 100 may be a scanner, a copy machine, a facsimile, or a multi-function peripheral (MFP) that complexly implements the functions of the scanner, the copy machine, and the facsimile through a single device.

The communication interface 110 may be connected to a host apparatus, such as a personal computer (PC), a notebook PC, a personal digital assistant (PDA), a digital camera, or the like, and receive documents from the host apparatus or transmit scan images (or image files) scanned by the image formation apparatus 100 to the host apparatus. Here, the received document may be print data generated by converting the document at the host apparatus, and may also be the document itself (e.g., a document file, an image file).

Specifically, the communication interface 110 is formed to connect the image formation apparatus 100 to an external apparatus, and may be not only connected to a terminal device through a local area network (LAN) and an Internet network, but also connected to the terminal device through a universal serial bus (USB) port or a wireless port (e.g., WIFI, Bluetooth, IEEE, Zigbee, 3rd generation (3G), 3rd generation partnership project (3GPP), long term evolution (LTE), or the like).

In addition, the communication interface 110 may receive commands related to a control of the image formation apparatus 100, such as a print command, a scan command, and the like, from the host apparatus. In this case, the communication interface 110 may receive the print data corresponding to the print command. In addition, here, the scan command may include not only a control command including only a scan processing, but also a control command such as a copy command including the scan processing, a fax transmission command, a scan-to-server, a scan-to-mobile, or the like. In this case, the print command or the print data may include a print option for a type of paper. Specifically, the print option of the type of paper may be an option for defining a size of a general print paper, as well as a print option that refers to the electronic paper. Therefore, when the electronic paper is set as the paper option, the image formation apparatus 100 may print the received print data on the electronic paper instead of the print paper.

In addition, the communication interface 110 may transmit data (e.g., scan images) stored in a storage 150 to the host apparatus or an administration server.

Here, the scan image is an image generated by the scanner scanning the manuscript, and the image file is an image file such as PDF, TIFF, or JPG which merges the generated images in units of job. Meanwhile, hereinabove, for convenience of explanation, although it is assumed that the image file includes a plurality of pages or a plurality of scan images, it is apparent that the image file may include only one scan image. In addition, here, the manuscript may be an electronic paper as well as a general paper manuscript.

The processor 120 performs a control for each of the components in the image formation apparatus 100. Specifically, the processor 120 controls an overall operation of the image formation apparatus 100 using various programs stored in the storage 150. For example, the processor 120 may include a central processing unit (CPU), a random-access memory (RAM), a read only memory (ROM), and a system bus.

When the processor 120 receives the print data through the communication interface 110, the processor 120 may parse the received print data to generate a bitmap image, and control the image former 200 so that the generated bitmap image is transferred to the electronic paper.

If the image formation apparatus 100 is configured to print both the paper and the electronic paper, the processor 120 preliminarily determines whether the print of the received print data is performed on the paper or is performed on the electronic paper. The processor 120 may adjust a setting value of the image former 200 depending on the determination of the print medium.

For example, if the determined print medium is the electronic paper, the processor 120 may control a charging member so that a charge is performed at a charging potential corresponding to the electronic paper, control consumables so that the toner is not supplied, and perform a control so that the roller member of initializing the electronic paper is operated while preventing the operation of the fuser.

After the setting as described above is completed, the processor 120 may control the roller member so that the electronic paper is initialized, and control the image former 200 so that an image corresponding to the print data is transferred to the initialized electronic paper.

On the other hand, if the determined print medium is a general paper, the processor 120 may control each of the components in the image former 200 so as to have a setting value according to the general electrophotographic manner, and control the roller member of initializing the electronic paper so as not be operated.

The image former 200 transfers the image in the electronic paper. Specifically, the image former 200 may perform the initialization by providing a common potential to each of a plurality of cell structures (or microcapsules) in the electronic paper, and the image former may be controlled so that a potential value corresponding to the image is applied to each of the plurality of initialized cell structures (or microcapsules). The detailed configuration and operation of the image former 200 will be described below with reference to FIG. 4.

Meanwhile, hereinabove, only a simple configuration of the image formation apparatus is illustrated and described, but various configurations may be additionally provided at the time of implementation. This will be described below with reference to FIG. 3.

Figure 3:
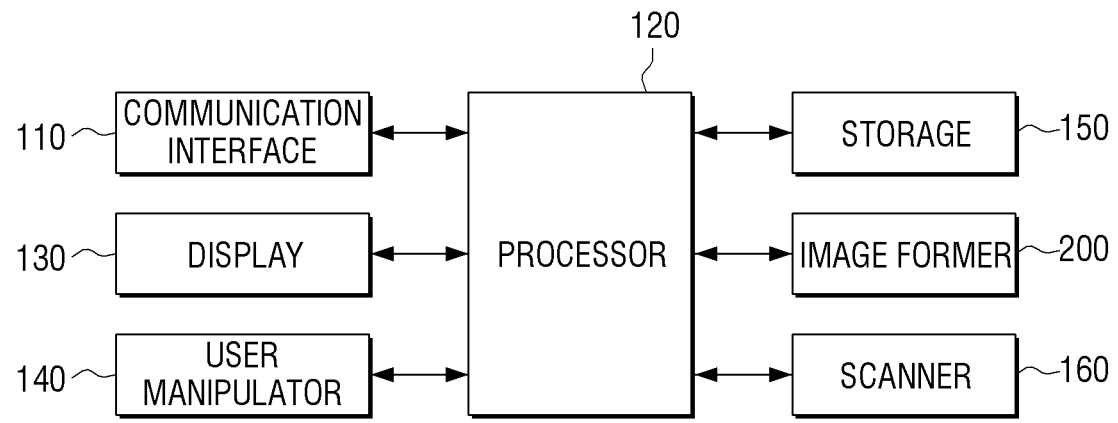
FIG. 3 is a block diagram illustrating a detailed configuration of an image formation apparatus of FIG. 1.

FIG. 3 is a block diagram illustrating a detailed configuration of the image formation apparatus of FIG. 1.

Referring to FIG. 3, the image formation apparatus 100 according to an example of the present disclosure includes the communication interface 110, the processor 120, a display 130, a user manipulator 140, the storage 150, a scanner 160, and the image former 200.

Because the functions of the communication interface 110, the processor 120, and the image former 200 are the same as those of the respective components in FIG. 2, an overlapped description is omitted.

The display 130 displays a variety of information provided from the image formation apparatus 100. Specifically, the display 130 may display a function of the image formation apparatus which is selectable by the user, or may display a screen through which an option corresponding to the function selected by the user is selected.

For example, when the function selected by the user is a copy function for the manuscript loaded on the scanner, the display 130 may display a user interface (UI) through which a medium (e.g., a general paper or an electronic paper) on which the manuscript is to be copied is selected. The display 130 may be implemented as a monitor such as CRT, LCD, or AMOLED, and may be implemented as a touch screen in combination with a function of the user manipulator 140, which will be described below.

The user manipulator 140 includes a plurality of function keys that the user may set or select various functions supported by the image formation apparatus 100. Therefore, through the user manipulator 140, the user may select a function to be performed by the image formation apparatus 100 and an option for the corresponding function. Such a user manipulator 140 may be implemented as an input device, such as a plurality of buttons, a mouse, or the like, and may also be implemented as a touch screen in combination with the display 130 described above.

For example, the user manipulator 140 may receive a copy command. In this case, the user may select the electronic paper instead of the conventional A4, letter, or the like, as the printing paper. In a case in which the user selects the electronic paper, the processor 120 may control the image former 200 so that the scan image scanned by the scanner 160 is transferred to the electronic paper.

The storage 150 may store a program for constituting various screens to be displayed on the user interface described above and an operating system and an application program for the operation of the image formation apparatus 100. Here, the operating system (OS) is a component of performing a function of controlling and managing an overall operation of hardware.

The storage 150 stores an image file. Specifically, the storage 150 may store scan images generated by the scanner 160 to be described below, or store an image file generated by merging the scan images in units of job. In addition, the storage 150 may store the print data received through the communication interface 110.

The storage 150 may be implemented as a storage medium (e.g., a flash-memory, a hard disk drive (HDD), or a solid-state drive (SSD)) in the image formation apparatus 100, an external storage medium, for example, a removable disk including a USB memory, a storage medium connected to a host, a web server over a network, and the like.

The scanner 160 scans the manuscript to generate a scan image. Specifically, the scanner 160 includes a light emitter (not shown) for emitting light to the manuscript, a lens (not shown) for forming the light reflected from the manuscript on an internal image sensor, an image sensor, and the like, and reads image information of the manuscript from the light formed on the image sensor.

Such a scanner 160 may be an apparatus for scanning a manuscript placed on a flatbed, may be an apparatus for scanning a section or both sides of the manuscript fed to an automatic document feeder (ADF), and may be a combination of the two apparatuses. Meanwhile, the scanner 160 may generate a plurality of scan images sequentially scanned in the automatic document feeder as one file.

Because the image formation apparatus 100 according to the present example as described above may transfer the image or character to the electronic paper in the electrophotographic manner, the electronic paper 300 may omit electrodes, transistors, and the like necessary for image transfer. Accordingly, it is possible not only to achieve thinness and lightness of the electronic paper 300 but also to produce the electronic paper at a low price.

Figure 4:
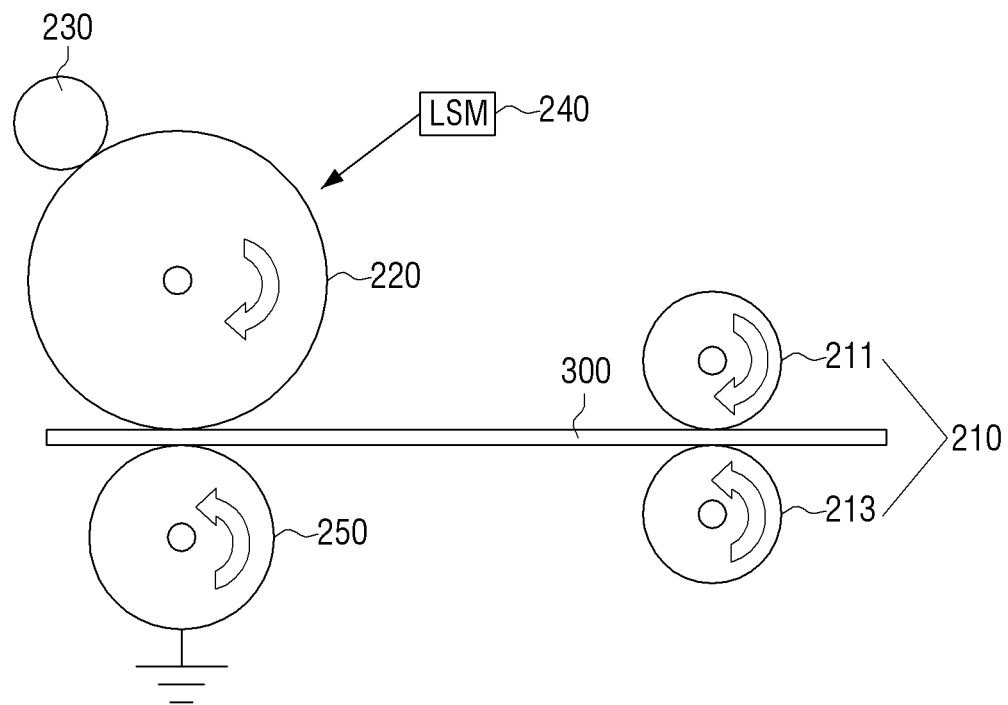
FIG. 4 is a view for describing a detailed configuration of an image former of FIG. 2.

FIG. 4 is a view for describing a detailed configuration of an image former of FIG. 2.

Referring to FIG. 4, the image former 200 includes a roller member 210, a photoreceptor 220, a charging member 230, an exposure member 240, and a transfer member 250. The image former 200 may further include a paper feeder (not shown) for feeding a recording medium.

The roller member 210 may initialize the electronic paper. Here, the initialization means that a display surface of the electronic paper 300 displays one color, and the display surface of the electronic paper 300 may be displayed as white or black. Specifically, the roller member 210 may provide a common potential difference to each of the plurality of cell structures in the electronic paper. Such a roller member 210 may include a first roller member 211 and a second roller member 213.

The first roller member 211 is a roller member that rotates in contact with an upper portion side of the electronic paper 300, and applies a predetermined first potential to the upper portion side of the electronic paper. In this case, the upper portion side of the electronic paper 300 is a region of a film layer 340 shown in FIG. 8 in a direction in which the electronic paper 300 displays the images or characters. That is, the first roller member 211 may apply the predetermined first potential to the film layer 340 of the electronic paper 300.

The second roller member 213 is a roller member that rotates in contact with a lower portion side of the electronic paper, and applies a predetermined second potential to the lower portion side of the electronic paper. Here, the second potential has a potential opposite to the first potential. In this case, the lower portion side of the electronic paper 300 is a region of a conductive layer 320 shown in FIG. 8 in a direction opposite to the direction in which the electronic paper 300 displays the images or characters. That is, the second roller member 213 may apply the predetermined second potential to the conductive layer 320 of the electronic paper 300.

Meanwhile, at the time of implementation, the first potential or the second potential may be 0, that is, may be grounded. For example, the first potential may have 10V and the second potential may have 0V. In this case, particles of specific color (e.g., black) charged in negative (−) in the electronic paper 300 passing through the roller member 210 are positioned at the top of each of the cell structures, and particles of specific color (e.g., white) charged in positive (+) are positioned at the bottom of each of the cell structures. Accordingly, the electronic paper 300 displays white. Meanwhile, hereinabove, it is described that a difference between two potentials is 10V, but at the time of implementation, a voltage difference in the range of 1V to 1000V may be used.

Meanwhile, at the time of implementation, the black particle may be charged in positive (+), and the white particle may be charged in negative (−). In addition, particles of other colors rather than black and white may also exist in the cell structure.

Meanwhile, at the time of implementation, a width of the first roller member 211 and a width of the second roller member 213 may be different from each other. Specifically, the width of the first roller member 211 may be wider than a width of the electronic paper 300, and the width of the second roller member 213 may be narrower than the width of the electronic paper 300. That is, the second roller member 213 may have the width corresponding to a width of a region in the electronic paper 300 in which the plurality of cell structures are disposed.

An electrostatic latent image is formed on the photoreceptor 220. The photoreceptor 220 may be referred to as a photosensitive drum, a photosensitive belt, or the like depending the form thereof.

The charging member 230 charges a surface of the photoreceptor 220 to a uniform potential. The charging member 230 may be implemented in the form of a corona charger, a charge roller, a charge brush, or the like. The surface of the photoreceptor 220 may have a potential value of approximately −500 to −700V according to the above-mentioned charging.

The exposure member 240 forms the electrostatic latent image on the surface of the photoreceptor 220 by changing the surface potential of the photoreceptor 220 according to image information to be printed. As an example, the exposure member 240 may form the electrostatic latent image by irradiating light modulated according to the image information to be printed onto the photoreceptor 220. Such a type of exposure member 240 may be referred to as a photoscanner or the like. For example, the surface of the photoreceptor 220 to which the light of the exposure member 240 is irradiated may have a potential value of approximately −10 to −50V.

The electrostatic latent image formed on the photoreceptor 220 is transferred to the electronic paper 300 by the transfer member 250. Specifically, because the transfer member 250 has a predetermined potential (0V or ground) as illustrated, a potential value (e.g., −500V to −700V or −10V to −50V) corresponding to an image to be transferred is applied to each of the plurality of cell structures in the electronic paper 300. For example, in a case in which particles of specific color charged in negative (−) are positioned at the top of each cell structure, color of the cell structures adjacent to the surface of the photoreceptor 220 in which the charge potential is maintained is changed because the particles of specific color charged in positive (+) are moved upwardly, and the cell structures adjacent to the surface of the photoreceptor 220 in which the charge potential is reduced move a current state without flowing of the particles of color. The print for the electronic paper may be performed by repeatedly performing such an operation according to a sub-scan direction of the electronic paper (specifically, a movement direction of the electronic paper).

A potential difference between the charged photoreceptor 220 and the transfer member 250 may be the same as the potential difference between the first roller member and the second roller member described above.

Meanwhile, the charge potential and the potential of the transfer member described above are merely illustrative, and may be changed depending on a type of the electronic paper and an environment in which the image formation apparatus is present, and values thereof may be optimized by experiment and may also be updated through firmware or the like.

Meanwhile, although not illustrated in FIG. 4, the image former 200 may further include a developing device (not illustrated) when the image former 200 may also perform the print job for the general paper. The developing device may supply a developer to the electrostatic latent image. For example, the developer may be supplied from a developing roller to the electrostatic latent image formed on the photoreceptor 220 by a developing electric field formed between the developing roller and the photoreceptor 220.

Meanwhile, referring to FIG. 4, it is illustrated that the electronic paper 300 is in simultaneous contact with the photoreceptor 220 and the roller member 210 and passes therethrough. However, in a case in which the electronic paper 300 is in contact with the two components (e.g., the photoreceptor and the roller member) that operate at different potentials, the electronic paper 300 may be subjected to electrical shock. Therefore, the roller member and the photoreceptor 220 may be spaced apart from each other by a length of the electronic paper so that the electronic paper 300 is in sequential contact with the two components. To this end, the roller member 210 may be disposed on a loader on which a plurality of electronic papers are loaded, rather than an internal space of the image formation apparatus in which the photoreceptor 220 is disposed.

Figure 5:
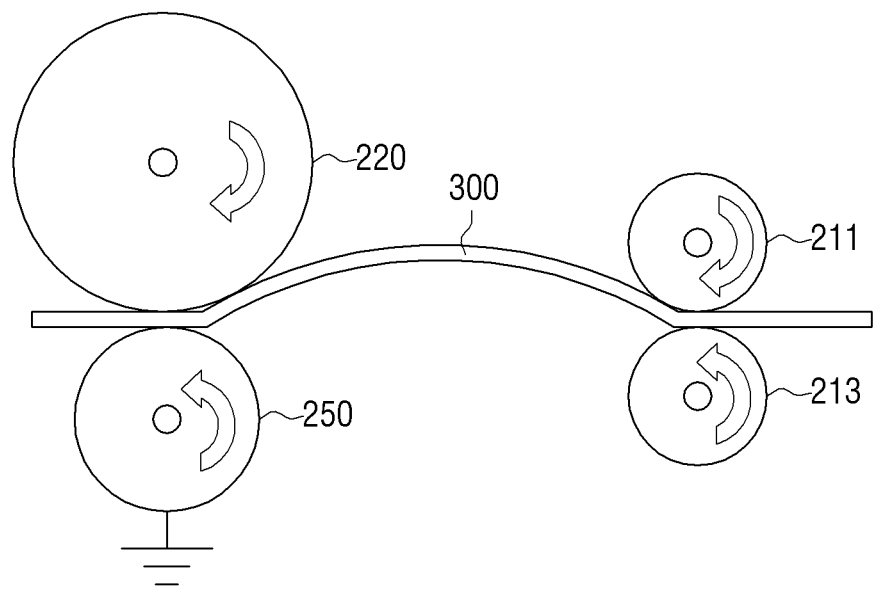
FIG. 5 is a view for describing an operation of a case in which a distance between a photoreceptor and a roller member is short.
Figure 6:
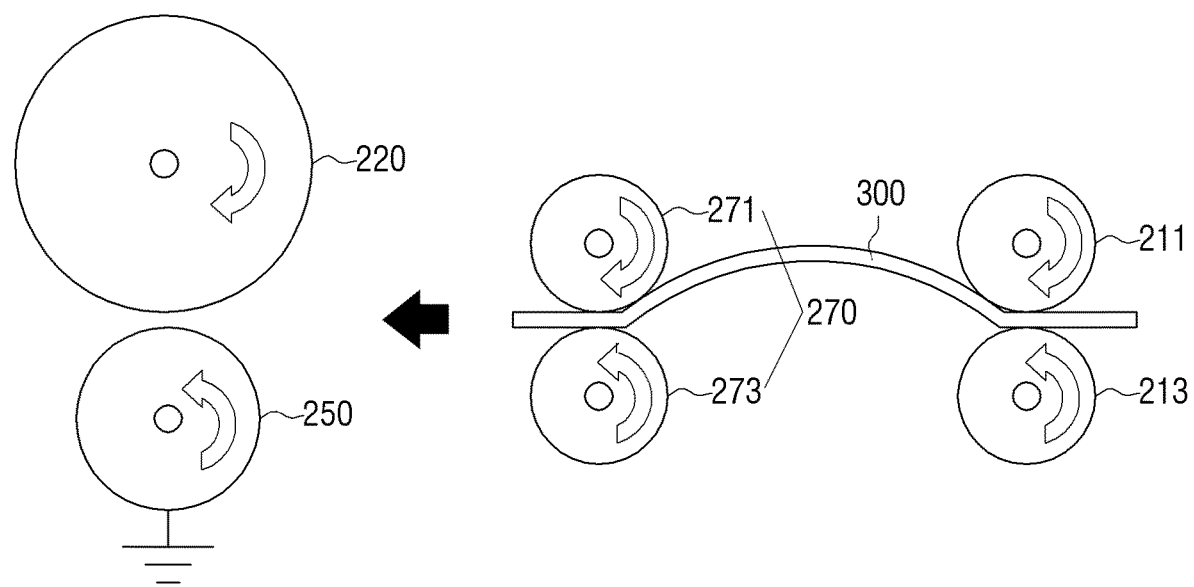
FIGS. 6 and 7 are views for describing another implementation example of the image former of FIG. 2.
Figure 7:
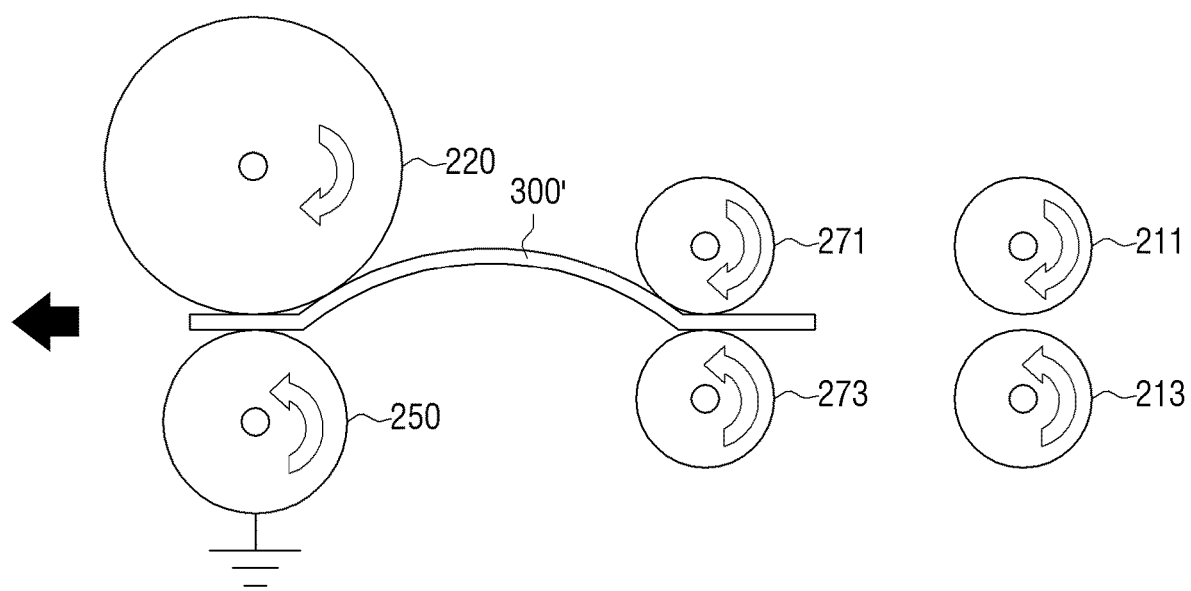

Alternatively, as illustrated in FIG. 5, the electronic paper 300 may be in sequential contact with the two components by controlling an operation order of the roller member and the photoreceptor, or as illustrated in FIGS. 6 and 7, the electronic paper 300 may be in sequential contact with the two components through an additional component.

FIG. 5 is a view for describing an operation of a case in which a distance between the photoreceptor 220 and the roller member is short.

Referring to FIG. 5, the electronic paper 300 passing through the roller member 210 does not directly enter the photoreceptor 220 but enters the photoreceptor after waiting for a predetermined period of time. Specifically, the roller member 210 passes the electronic paper 300 through rotation, but because the photoreceptor 220 and the transfer member 250 rotate after waiting for a predetermined period of time without rotating, the electronic paper 300 passing through the roller member 210 has a bent state as illustrated in FIG. 5.

Because the electronic paper has the bent form as described above, the contact of the electronic paper 300 to the photoreceptor 220 and the roller member 210 at the same time may be minimized.

FIGS. 6 and 7 are views for describing another implementation example of the image former of FIG. 2.

Referring to FIGS. 6 and 7, an image former includes the roller member 210, the photoreceptor 220, the charging member 230, the exposure member 240, the transfer member 250, and middle roller members 271 and 273.

The roller member 210, the photoreceptor 220, the charging member 230, the exposure member 240, and the transfer member 250 are the same as components of FIG. 4, and an overlapped description is omitted.

The middle roller members 271 and 273 are disposed between the photoreceptor 220 and the roller member 210, and deliver the electronic paper passing through the roller member 210 to the photoreceptor 220. Such middle roller members 271 and 273 may be formed of an insulator.

In addition, as illustrated in FIG. 6, a curved member as illustrated in FIG. 5 may be disposed between the roller member 210 and the middle roller members 271 and 273. In addition, as illustrated in FIG. 7, a curved member as illustrated in FIG. 5 may be disposed between the middle roller members 271 and 273 and the photoreceptor 220.

Figure 8:
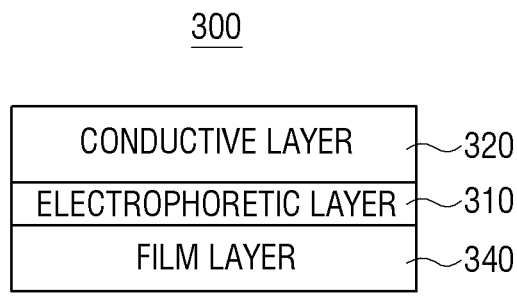
FIG. 8 is a cross-sectional view of an electronic paper according to an example of the present disclosure.

FIG. 8 is a cross-sectional view of an electronic paper according to an example of the present disclosure.

Referring to FIG. 8, the electronic paper 300 includes an electrophoretic layer 310, a conductive layer 320, and a film layer 340.

The electrophoretic layer 310 displays an image in an electrophoretic manner. Specifically, the electrophoretic layer 310 may display a color or monochrome image pattern through movement of particles (e.g., an electrophoresis phenomenon) according to an applied electric field, and may display an image through reflection or absorption of external light incident on the pattern. For example, the electrophoretic layer 310 may have a configuration in which cell structures (or microcapsules, a cup form) filled with a transparent fluid containing white and black particles, respectively, are disposed between a lower electrode and an upper electrode, and may display a black or white image pattern by applying an electric field to each cell structure. For example, the white particle is charged in positive (+) and the black particle is charged in negative (−) such that the white particle and the black particle are moved in directions opposing to each other according to the applied electric field. Such a cell structure may be the form of the microcapsule and may be a partition structure of the cup form. The case in which the cell structure is configured in the form of the microcapsule will be described below with reference to FIG. 9, and the case in which the cell structure is configured in the cup form will be described below with reference to FIG. 10.

The image pattern of the electrophoretic layer 310 is maintained up to a point of time of an electric field change. The electrophoretic layer 310 may display a color image pattern, and such a color display may be implemented by stacking a color filter on the bottom of the electrophoretic layer 310, or using coloring particles instead of the monochrome particles, as the particles constituting the electrophoretic layer 310.

The conductive layer 320 is disposed on the top of the electrophoretic layer 310. Specifically, the conductive layer 320 may be positioned on the top of the electrophoretic layer 310, may maintain a predetermined potential, and may be connected to a ground. Meanwhile, at the time of implementation, a top substrate for protecting the conductive layer may be disposed on the top of the conductive layer 320. Such a conductive layer 320 may be constituted by a transparent electrode as in the related art, but because the electronic paper according to the present example displays the images or characters in a lower direction rather than an upper direction, the conductive layer 320 may also be constituted by an opaque electrode.

The film layer 340 is disposed on the bottom of the electrophoretic layer 310. Specifically, the film layer 340 may be disposed on the bottom of the electrophoretic layer 310, and transmits the image displayed on the electrophoretic layer 310. Such a film layer 340 is adhered to the electrophoretic layer 310 with a conductive adhesive material and may be formed of a thermoplastic resin having light transmittance. Such a film layer 340 may use a film formed of a material such as an acrylic compound, an amide compound, a phthalate compound, polypropylene, and polyethylene. Meanwhile, at the time of implementation, a hard coating layer that performs an anti-glare function may also be additionally disposed on the bottom of the film layer 340.

The electronic paper 300 according to the present example as described above may be implemented to be thinner because the electrophoretic layer 310 does not include the configuration of the electrodes and the transistors for displaying a specific image.

Figure 9:
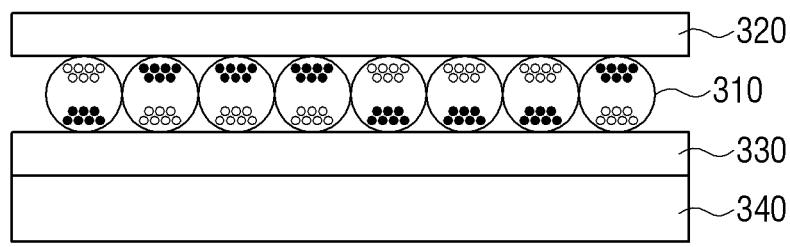
FIG. 9 is a cross-sectional view of an electronic paper constituted by microcapsules.

FIG. 9 is a cross-sectional view of an electronic paper constituted by microcapsules.

Referring to FIG. 9, the electronic paper 300 includes the electrophoretic layer 310, the conductive layer 320, the film layer 340, and a protective layer 330.

The electrophoretic layer 310 may include a plurality of microcapsules, and may display a black or white image pattern by applying an electric field into the plurality of microcapsules. For example, the white particle is charged in positive (+) and the black particle is charged in negative (−) such that the white particle and the black particle are moved in directions opposing to each other according to the applied electric field. Here, the black particle may be copper, chromite, or styrene, and the white particle may be $TiO_2$ or PMMA.

The conductive layer 320 is disposed on the top of the electrophoretic layer 310. Specifically, the conductive layer 320 may be positioned on the top of the electrophoretic layer 310, may maintain a predetermined potential, and may be connected to a ground.

The film layer 340 is disposed on the bottom of the electrophoretic layer 310. Specifically, the film layer 340 may be disposed on the bottom of the electrophoretic layer 310, and transmits the image displayed on the electrophoretic layer 310. Such a film layer 340 is adhered to the electrophoretic layer 310 with a conductive adhesive material and may be formed of a thermoplastic resin having light transmittance.

The protective layer 330 is disposed on at least one surface of the top and bottom of the electrophoretic layer 310, and protects the electronic paper. Such a protective layer 330 may be formed of cellulose pulp or inorganic filler, and it is illustrated in the example that the protective layer 330 is disposed on the bottom of the electrophoretic layer 310, but may be disposed on the top of the electrophoretic layer 310 at the time of implementation. In addition, the protective layer 330 may also be disposed between the plurality of microcapsules in the electrophoretic layer 310.

Meanwhile, in describing FIGS. 8 and 9, it is described that the conductive layer 320 is included in the electronic paper 300, but the film layer may also be disposed at the top of the electrophoretic layer 310 in the same manner as the bottom of the electrophoretic layer 310. That is, the electronic paper may also be implemented in the form in which a first film layer, the electrophoretic layer, and a second film layer are sequentially stacked in this order from the top.

Figure 10:
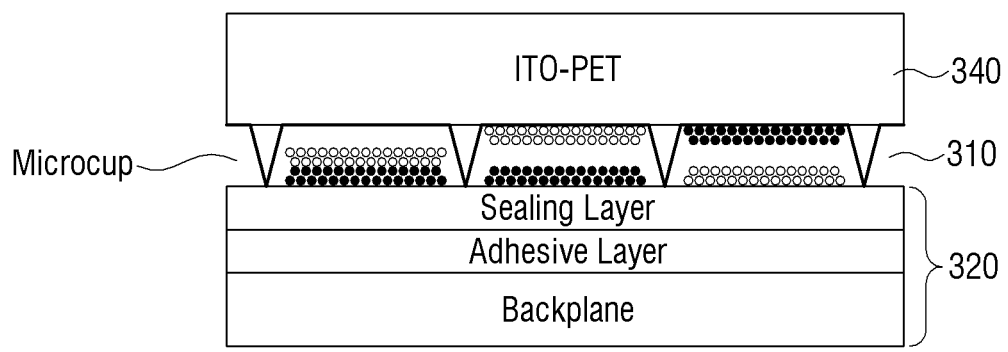
FIG. 10 is a cross-sectional view constituted in a cup shape.

FIG. 10 is a cross-sectional view constituted in the form of a cup.

Referring to FIG. 10, an electronic paper includes an electrophoretic layer 310, a conductive layer 320, and a film layer 340.

The electrophoretic layer 310 may include a plurality of cup-shaped partition structures, and may display a black or white image pattern by applying an electric field into the plurality of cup structures.

The conductive layer 320 is disposed on one surface of the electrophoretic layer 310. Specifically, the conductive layer 320 may include a sealing layer for sealing the electrophoretic layer, a backplane layer, and an adhesive layer for bonding the sealing layer and the backplane layer to each other.

The film layer 340 is disposed on the other surface of the electrophoretic layer 310. Specifically, the film layer 340 may be formed of polyethylene terephthalate.

Figure 11:
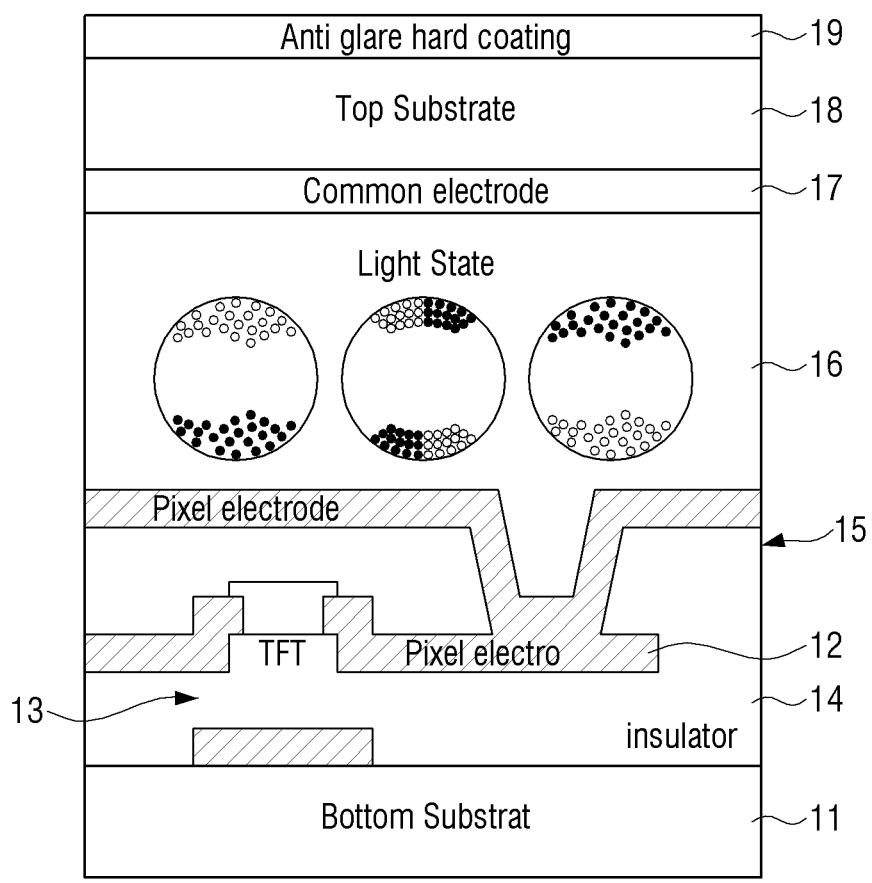
FIG. 11 is a cross-sectional view of the conventional electronic paper.

FIG. 11 is a cross-sectional view of the conventional electronic paper.

Referring to FIG. 11, the conventional electronic paper 10 may include a bottom substrate 11, an organic electronics backplane 15, an ink layer 16, a common electrode layer 17, a top substrate 18, and a hard coating layer 19 which are sequentially stacked.

The organic electronics backplane 15 may be classified into a plurality of pixels, and each pixel may include a pixel electrode 12 and a thin film transistor (TFT) 13 which are partially or entirely embedded in an insulating layer 14, or are partially or entirely stacked on an upper surface of the insulating layer 14.

As described above, the conventional electronic paper 10 had to have a somewhat thick organic electronics backplane 15 for controlling an operation of the ink layer 16. Accordingly, the conventional electronic paper has to be somewhat thicker, but because the electronic paper according to the present example does not have such an organic electronics backplane, it has a thinner thickness.

In addition, because the conventional electronic paper has to have the organic electronics backplane 15, an image or a character may not be displayed on the bottom of the ink layer 16. However, because the electronic paper according to the present example does not include the organic electronics backplane 15, the image or the character may be displayed on the bottom of the ink layer 16.

Further, in a case in which the conductive layer 320 described above is implemented using a transparent electrode, the electronic paper 300 may also be implemented to operate as a form that displays the image or the character on both the top and bottom of the electronic paper 300, that is, as a double-sided display.

In addition, at the time of implementation, it is possible to implement the form in which the conductive layer 320 is removed. Specifically, according to the related art, in order to apply a specific potential to the top and bottom of the microcapsule, the pixel electrode disposed on the bottom and the common electrode disposed on the top are required, but in the electronic paper 300 according to the present example, because the potential difference is applied to the microcapsule by the photoreceptor 220 and the transfer medium 250 in the image forming apparatus, the conductive layer 320 may also be removed.

Figure 12:
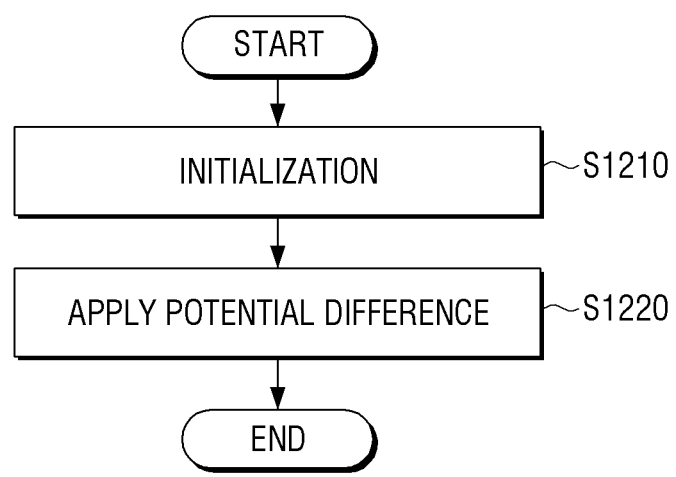
FIG. 12 is a flowchart for describing a printing control method according to an example of the present disclosure.

FIG. 12 is a flowchart for describing a printing control method according to an example of the present disclosure.

Referring to FIG. 12, if the image formation apparatus receives a print command for the electronic paper, the image formation apparatus may control a driving roller so that the electronic paper is put on a print path. If the image formation apparatus may also print the print paper, and the print paper and the electronic paper are moved in different paths, the electronic paper may be moved in a movement path of the electronic paper (a path passing through the roller member that initializes the electronic paper).

In addition, a predetermined common potential is applied to a plurality of microcapsules in the electronic paper and the electronic paper may be initialized to display a common color (white or black) at operation S1210. Meanwhile, when the image formation apparatus uses the electronic paper that does not display the image at the time of implementation, the initialization operation as described above may be omitted.

In addition, a potential value corresponding to the image may be applied to each of the initialized plurality of microcapsules at operation S1220. Specifically, a potential value for displaying a pixel value (white or black) corresponding to the microcapsule may be applied to each of the microcapsules.

Because the printing control method according to the present example may transfer the image to the electronic paper in the general electrophotographic manner, the electronic paper 300 may omit electrodes, transistors, and the like necessary for image transfer. Accordingly, it is possible not only to achieve thinness and lightness of the electronic paper 300 but also to produce the electronic paper at a low price. The printing control method as illustrated in FIG. 11 may be executed on the image formation apparatus having the configuration of FIGS. 2 and 3, and may also be executed on an image formation apparatus having other configurations.

In addition, the printing control method as described above may be implemented by at least one execution program for executing the display method as described above, and the execution program may be stored in a computer readable recording medium.

Therefore, the respective blocks according to the present disclosure may be implemented as computer recordable codes on the computer readable recording medium. The computer readable recording medium may be a device in which data that may be read by a computer system may be stored.

Although the examples of the present disclosure have been illustrated and described hereinabove, the present disclosure is not limited to the abovementioned specific examples, but may be variously modified by those skilled in the art to which the present disclosure pertains without departing from the gist of the present disclosure as disclosed in the accompanying claims. These modifications should also be understood to fall within the scope and spirit of the present disclosure.

The invention claimed is:

1. An electronic paper comprising:
   an electrophoretic layer to display an image in an electrophoretic manner;
   a conductive layer to be disposed on top of the electrophoretic layer; and
   a film layer to be disposed on bottom of the electrophoretic layer to transmit the displayed image,
   wherein the electrophoretic layer includes a plurality of cell structures in which chargeable particles are moveable by application of respective potentials of members to the electrophoretic layer and the film layer to apply a potential difference between the electrophoretic layer and the film layer.

2. The electronic paper as claimed in claim 1, wherein the cell structure is the form of a microcapsule or the form of a cup.

3. The electronic paper as claimed in claim 1, wherein in each of the cell structures, the conductive layer forms an upper conductive layer and the film layer forms a lower film layer, and the charged particles are moved according to the potential difference between the upper conductive layer and the lower film layer of each of the cell structures.

4. The electronic paper as claimed in claim 1, wherein the film layer is formed of a thermoplastic resin.

5. The electronic paper as claimed in claim 4, wherein the film layer is formed of at least one material of an acrylic compound, an amide compound, a phthalate compound, polypropylene, and polyethylene.

6. The electronic paper as claimed in claim 1, further comprising a protective layer to be disposed on at least one surface of the top and bottom of the electrophoretic layer.

7. The electronic paper as claimed in claim 6, wherein the protective layer includes at least one of a cellulose pulp and an inorganic filler.

8. The electronic paper as claimed in claim 1, wherein the electrophoretic layer and the film layer are bonded to each other by a conductive adhesive material.

9. The electronic paper as claimed in claim 1, wherein the film layer has transparency of 60% or more.

10. An image formation apparatus comprising:
a communication interface to receive print data;
an image former to transfer an image corresponding to the received print data to an electronic paper, the electronic paper including,
an electrophoretic layer including a plurality of cell structures to display the image in an electrophoretic manner;
a conductive layer disposed on top of the electrophoretic layer; and
a film layer disposed on bottom of the electrophoretic layer to transmit the displayed image,
wherein the plurality of cell structures include chargeable particles that are moveable by application of respective potentials of members to the electrophoretic layer and the film layer to apply a potential difference between the electrophoretic layer and the film layer; and
a processor to perform an initialization by performing a control to apply, by a member, among the members, a common potential difference to each cell structure of the plurality of cell structures in the electronic paper, and to control the image former so that a potential value corresponding to the image is applied by a member, among the members, to each cell structure of the initialized plurality of cell structures.

11. The image formation apparatus as claimed in claim 10, wherein the members having the respective potentials include:
a roller member to provide the common potential difference to each cell structure of the plurality of cell structures in the electronic paper; and
a photoreceptor to provide a potential difference corresponding to the image to the electronic paper passing through the roller member.

12. The image formation apparatus as claimed in claim 11, wherein the roller member includes:
a first roller member to be rotated while being in contact with the conductive layer as an upper portion side of the electronic paper; and
a second roller member to be rotated while being in contact with the film layer as a lower portion side of the electronic paper, and
the first roller member and the second roller member provide different potentials to the electronic paper.

13. The image formation apparatus as claimed in claim 11, wherein the image former further includes:
a charging member to charge the photoreceptor;
an exposure member to expose light corresponding to the image to the charged photoreceptor; and
a transfer member to transfer a surface potential of the photoreceptor to the electronic paper.

14. A printing control method of an image formation apparatus, the printing control method comprising:
initializing a plurality of cell structures of an electronic paper by applying a common potential difference to each cell structure of the plurality of cell structures, the electronic paper including,
an electrophoretic layer including the plurality of cell structures to display the image in an electrophoretic manner;
a conductive layer disposed on top of the electrophoretic layer; and
a film layer disposed on bottom of the electrophoretic layer to transmit the displayed image,
wherein the plurality of cell structures include chargeable particles that are moveable by application of respective potentials of members to the electrophoretic layer and the film layer to,
apply the common potential difference between the electrophoretic layer and the film layer, and
apply a potential value corresponding to an image to each cell structure of the initialized plurality of cell structures.

* * * * *